UNITED STATES PATENT OFFICE.

PAUL EHRLICH AND PAUL KARRER, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ARSENO-AZO COMPOUNDS AND PROCESS OF MAKING SAME.

1,120,700.      Specification of Letters Patent.      Patented Dec. 15, 1914.

No Drawing.      Application filed February 2, 1914. Serial No. 816,097.

*To all whom it may concern:*

Be it known that we, PAUL EHRLICH, M. D., professor of medicine, and PAUL KARRER, Ph. D., chemist, citizens of the Empire of Germany and Republic of Switzerland, respectively, residing at Frankfort-on-the-Main, Germany, have invented certain new and useful Improvements in Arseno-Azo Compounds and Processes of Making Same, of which the following is a specification.

We have found that azo dyestuffs containing an arseno group —As=As— which were hitherto unknown can be produced by reducing azo dyestuffs containing the arsinic acid group —$AsO_3H_2$ by means of hypophosphorous acid. This reducing agent does not alter the azo group, but only attacks the arsinic acid group so as to form the corresponding arseno compound. These new arseno-azo dyestuffs are colored compounds dissolving in alkalis and they are of great value for therapeutical purposes; they can be converted into starting azo dyestuffs containing the arsinic acid group, by an oxidizing agent such as hydrogen peroxid or the like. They are very little soluble or insoluble in organic solvents for instance alcohol, benzene or the like.

The following examples will illustrate our invention:

Example I: To 5 grams of the azo dyestuff obtainable by coupling 3.4-diazo-oxy-diphenyl-1-arsinic acid with phloroglucin

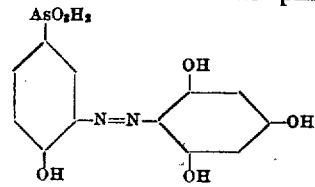

are added 50 grams of hydrophosphorous acid of 35 per cent. strength and the mixture is kept boiling for ½ hour while well stirring. The red dyestuff which separates is filtered off and washed with water; it is soluble in alkalis with a red color and corresponds to the formula:—

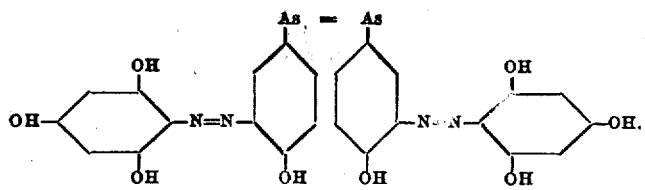

Example II: 3 grams of the dyestuff

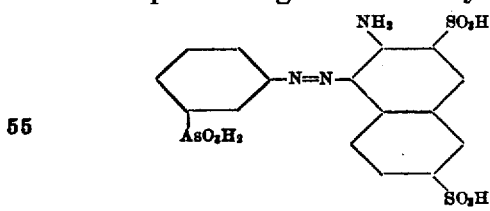

produced from m-aminophenylarsinic acid and 2.3.6-aminonaphthalene disulfonic acid, are dissolved in 50 cc. of hypophosphorous acid and heated to boiling. After a short time the arseno-azo dyestuff

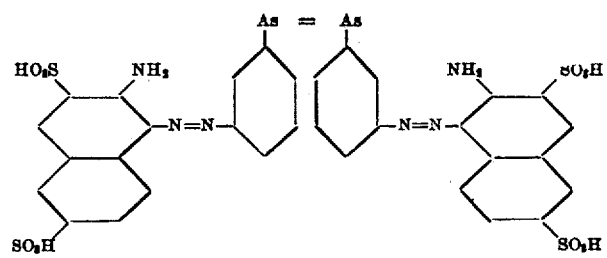

separates as a brownish-red powder which is soluble in alkalis with a red color.

Example III: 10 grams of the dyestuff produced from diazoatoxyl and 1.8.3.6- aminonaphtholdisulfonic acid and having the formula:

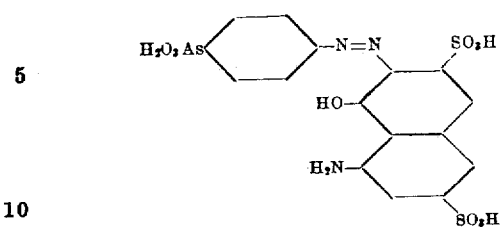

are dissolved in 100 cc. of hypophosphorous acid of 25 per cent. strength and heated to boiling. The dyestuff dissolves and the difficultly soluble arseno compound separates at once. This compound, when dry, forms a dark powder with a metallic luster and dissolves in water and alkalis to a violent solution. It corresponds to the formula:—

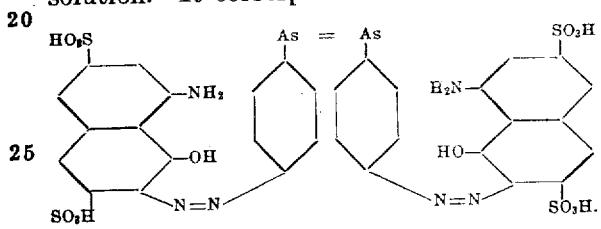

Having now described our invention what we claim is:

1. As new products, azo compounds containing an arseno group, being colored compounds which dissolve in alkalis and which can be converted by hydrogen peroxid into the corresponding arsenic acids of the azo dyestuffs; being almost insoluble in alcohol, ether, benzene and similar organic solvents.

2. As a new product, the arseno-azo compound the constitution of which corresponds to the formula:

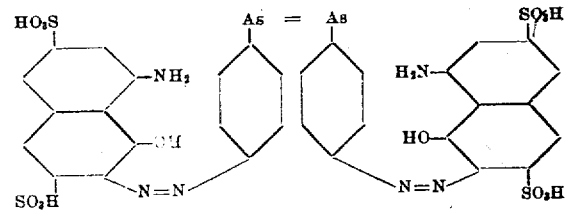

being a dark powder, dissolving in caustic soda-lye with a violet color and being insoluble in alcohol, ligroin and ether.

3. As a new process, the treatment of azo-compounds containing an arsinic acid group with hypophosphorous acid.

In testimony whereof, we affix our signatures in presence of two witnesses.

PAUL EHRLICH.
PAUL KARRER.

Witnesses:
JEAN GRUND,
CARL GRUND.

It is hereby certified that in Letters Patent No. 1,120,700, granted December 15, 1914, upon the application of Paul Ehrlich and Paul Karrer, of Frankfort-on-the-Main, Germany, for an improvement in "Arseno-Azo Compounds and Processes of Making Same," errors appear in the printed specification requiring correction as follows: Page 2, line 18, for the word "violent" read *violet;* same page, line 36, for the word "dyestuffs" read *compounds;* and that the said Letters Patent should be read with these corrections therein that the same may conform to the record of the case in the Patent Office.

Signed and sealed this 4th day of May, A. D., 1915.

[SEAL.] R. F. WHITEHEAD,
*Acting Commissioner of Patents.*